Patented Feb. 26, 1946

2,395,524

UNITED STATES PATENT OFFICE 2,395,524

METHOD OF PREPARING POROUS SILICA

Harry B. Weiser and Winfred O. Milligan, Houston, Tex., assignors to Houdry Process Corporation, Wilmington, Del., a corporation of Delaware No Drawing. Application July 22, 1941, Serial No. 403,531

5 Claims. (Cl. 252—317)

The present invention relates to the preparation of adsorptive contact masses. More particularly, it is directed to methods of producing porous contact masses having controlled surface and/or pore characteristics. It is especially concerned with such masses derived from gels, gelatinous precipitates and the like, and with methods of producing the desired gel, gelatinous precipitate or the like, and the improved finished products.

The nature and extent of surfaces and pores are the important features of precipitated or coagulated gelatinous products which are to be used to enter into, promote, or in any way assist fluid contact operations, for example, as a catalyst, promoter, catalyst support, diluent or adsorbent. Although great active areas and high porosity are generally desirable in contact masses, these properties alone, even when developed to fullest extent, do not always insure economical commercial scale contact processes.

In many industrial contact operations lower yields of desired products, higher losses, rapid loss of adsorptivity or other activity of the contact mass, have resulted from use of contact masses of extensively developed active surface. Contact materials derived from gels or precipitates prepared by ordinary or known methods, for example, by the now classic method developed by Patrick, often possess active surface and pores of uncontrolled nature which adversely affect their value for many commercial usages. One property commonly possessed by such masses which affects their specific activity characteristics is that of sorption and desorption hysteresis. For example, silica gel prepared by commonly known methods, as exemplified by that of Patrick (U. S. Patent 1,297,294) or van Bemmelen (Z. anorg. allgem. Chem. 13, 233, (1897)), when subjected to repeated hydration and dehydration under conditions of temperature and pressure which yield a number of equilibrium values, the curves plotted for the resulting desorption and resorption values coincide only at low pressure and at pressure approaching the vapor pressure of water at the temperature obtaining within the system. At intermediate pressure, the values fall on separated distinct curves, the curve for dehydration showing that for each intermediate pressure the gel retains or contains greater quantities of water than during its hydration at the same pressure. This phenomenon indicates that the porous material is constituted of at least two different types of active surface, each of which has its independent specific effect upon the course of chemical and/or other processes. However, in utilizing contact masses for many purposes, including catalysis, active participation of the mass or a portion of it in chemical processes, and adsorption, it is of importance that the active surface of the mass be appropriately and selectively limited in extent, nature or both.

One object of the invention is to prepare contact masses having desired surface characteristics. Another object is selectively to limit the active surface characteristics. Another object is to produce contact masses in which sorption and desorption hysteresis is absent or substantially so. Another object is to provide novel adsorptive porous products. Other objects will be apparent from the detailed discussion which follows.

The invention involves production of hydrous oxide gels or gelatinous precipitates from alkaline solutions of desired oxide, which solutions have been subjected to elevated temperature sufficiently high to promote rapid hydrolysis of the solution for time sufficient to increase substantially the proportionate quantity of colloidal oxide in the solution with respect to its total oxide content. The gel forming reactions are then induced while the oxide is still in converted or hydrolyzed colloidal condition, i. e. before there is substantial reversion to original form of colloidal oxide formed by the hydrolysis. After its preparation, the gel may be, and usually is washed free of water solubles such as alkali metal salts, and dried. If desired, drying may precede washing. Whether it precedes or follows washing it may be conducted at room temperature or desired elevated temperature.

To promote the desired hydrolysis, it is essential that the alkaline solution, after being heated to temperature substantially above room temperature, be held at or above the selected temperature for substantial time. Generally, the necessary time is longer with comparatively low elevated temperatures and shorter with higher temperatures. In order to obtain a finished product exhibiting little or no sorption and desorption hysteresis, it is preferred that the aging treatment or hydrolysis be effected at temperatures of at least 140° F., as for example, within the range of 140° F. to the boiling point of the alkaline solution. Although temperatures somewhat below 140° F. may sometimes be employed, at such lower temperatures the desired hydrolysis takes place to more limited extent and at greatly reduced reaction velocities, necessitating treating times which are excessive from the view point of economical commercial scale operations. At aging temperature of 140° F. and above, periods of time within the approximate range of fifteen minutes to twenty-four hours are required to produce a product having substantially common sorption and desorption curves. At temperature of about 212° F. it is usually unnecessary to employ times exceeding a few hours, as for example, three hours. Temperatures above the boiling point of water or of the solution may be employed with appropriate superatmospheric pressures. However, temperatures sufficiently high to produce substantial precipitation in the absence of a coagulant or precipitant should be avoided. The best results are obtained at temperature not in excess of 300° F.

The time element, whose use is essential to successful practice of the invention, depends, not only upon the magnitude of the super-atmospheric temperature, but also upon the character of the alkaline solutions employed. Alkaline reactant solutions, as produced in technical or commercial quantities, may contain greater and lesser proportionate quantities of the desired dissolved oxide in ionic and colloidal forms depending upon the method of manufacture and the proportionate amount of alkaline material utilized. Thus, for example, solutions of silica in alkali metal hydroxide are obtainable in forms ranging from the highly alkaline solutions of meta-silicate, which contains relatively high concentrations of silicate ions, to highly silicious and less alkaline silicates, in which the silica occurs to substantial extent in colloidal condition. Generally speaking, it is necessary to maintain the alkaline solution at the selected temperature for greater periods of time the greater the degree of alkalinity and ionization. For example, in the practice of the invention to prepare from sodium metasilicate solution gels having little or no hysteresis while utilizing treating temperature of about 212° F., it is usually necessary to maintain that temperature for an hour or more, as for example, up to three or more hours. On the other hand, when a solution containing approximately double the molar proportionate quantity of silica is employed, the desired product is obtained with hydrolysis time of an hour or less, sometimes fifteen minutes being sufficient.

The actual production of the gel, which is effected by mixing a suitable and often acidic precipitant or coagulant with the heat treated alkaline solution, must be effected before the hydrolysis promoted by the heat treatment has reversed to substantial extent. Thus, if desired, precipitation may be induced in the hot heat treated solutions. Reversion of the colloidal oxide formed by hydrolysis is relatively slow, and consequently the invention is not limited to precipitation at heat treatment or other elevated temperature. Advantages characteristic of practice of the invention are obtained when precipitation is carried out at ordinary temperature after the aged alkaline solution has been cooled. It is often desirable, by reason of plant control and other considerations, to precipitate cool or cooled heat treated solutions.

The invention is not limited to the production of silica gel. On the contrary, it finds application in the production of contact masses containing or consisting of one or a plurality of hydrous or hydrous hydrated oxides. For example, in addition to or in place of silica, the precipitated material may comprise one or more hydrous oxides of the metals columbium, tantalum, titanium, aluminum.

The precipitating or coagulating agent may be or contain a mineral or organic acid, for example, sulphuric, hydrochloric, acetic, nitric or formic acids, or it may comprise a gaseous precipitant as carbon dioxide. Likewise, the precipitant or coagulant may be a salt or other compound exhibiting the desired precipitating or coagulating properties, for example, ammonium chloride, ammonium sulphate, ammonium carbonate, ammonium nitrate, or amino hydrochlorides. The coagulating compound may contain a metal or oxide which is precipitated in crystalline, cryptocrystalline or amorphous form under the conditions obtained during precipitation of the heat treated alkaline solution. For example, the coagulant may be a soluble compound of any desired metal of the second to the eighth groups of the periodic table, as of aluminum, zirconium, beryllium, thorium, molybdenum, tungsten, chromium, etc. Thus, the coagulant may be a salt of the desired metal, as for example, an aluminum sulphate or chloride, zirconium sulphate or nitrate, or the metal may occur in anionic form, as for example, in an alkali metal aluminate, tungstate or tantalate.

In instances where plural component hydrous oxides are precipitated from a plurality of alkaline solutions, as exemplified by the interaction of sodium silicate and sodium aluminate, either or both of the alkaline solutions may be subjected to the heat treatment of the invention. It is usually advisable to effect heat treatment of the individual solutions before their admixture. In some instances, however, as for example, when the admixed solutions do not form gel or precipitate to substantial extent under the conditions of the heat treatment or when it is necessary to induce precipitation by addition of a coagulating agent, the heat treament may be made on the composited solutions.

It is to be emphasized that the invention is not concerned simply with precipitation or gel formation at elevated temperatures. On the contrary, it is directed to the controlled heat treatment of alkaline reactants in the substantial absence of precipitants or coagulants. Precipitation or gel formation is effected subsequently as a separate and distinct step under any suitable precipitating or coagulating conditions.

The following examples are given for the purpose of illustration only and are not to be construed as limiting the scope of the invention.

Example 1

An alkaline solution of silica and sodium oxide was prepared by diluting with water commercial water glass containing approximately two mols of silica for each mol of sodium oxide to produce a solution containing of the order of 130 grams of silica per liter. This diluted solution was heated until its temperature reached 212° F. and its temperature was maintained at about this level for a period of 15 minutes. At the end of this time 40 volumes of the heat treated solution was mixed with approximately 50 volumes of diluted acetic acid solution containing approximately 15 volumes of the glacial acid. The gel which resulted was washed substantially free of water solubles and then slowly dried at room temperature in a current of dry air.

The washed and dried gel was then subjected to repeated hydrations and dehydrations at approximately 55° F. and within the absolute pressure range of 0.01 mm. of mercury to the vapor pressure of water at the temperature of the system. The water content of the gel was determined at a number of pressures within the above range after the system had reached equilibrium conditions at each selected pressure, these determinations being made both during hydrations and dehydrations. The results of these determinations are given in the following table:

| Absolute pressure mm. Hg | Water content mols $H_2O/SiO_2$ | |
|---|---|---|
| | Hydration | Dehydration |
| 1.0 | 0.38 | 0.38 |
| 2.0 | 0.51 | 0.51 |
| 3.0 | 0.60 | 0.61 |
| 4.0 | 0.68 | 0.72 |
| 5.0 | 0.74 | 0.78 |
| 6.0 | 0.80 | 0.83 |
| 7.0 | 0.87 | 0.89 |
| 8.0 | 0.94 | 0.96 |
| 9.0 | 1.06 | 1.06 |
| 10.0 | 1.29 | 1.29 |
| 11.0 | 1.94 | 1.94 |

It is evident from this table that during both hydration and dehydration processes the water content of the gel at any selected pressure is substantially the same. This gel exhibited substantially identical dehydration and hydration characteristics at other temperature levels and corresponding pressure ranges.

Silica gel prepared as described in this example was valuable for use as a support for metal or metal oxide to provide catalytically and/or chemically active contact masses. Another acid, for example, hydrochloric, or an acidic salt, for example, ammonium chloride, are illustrative of other precipitants valuable for use in forming such silica gel. Contact masses valuable for promoting polymerization and decompositions of hydrocarbons may be produced by interaction of the heat treated alkali metal silicate with a suitable quantity of aluminum salt, for example, aluminum sulphate.

*Example 2*

A solution of sodium metasilicate ($Na_2SiO_3$) containing approximately 130 grams of silica per liter was prepared. One portion of this solution was heated to about 212° F. and held at that temperature for approximately 15 minutes when it was mixed with acetic acid solution in substantially the proportion and concentration described in Example 1. Another portion of the metasilicate solution was heated to 212° F. and held at that temperature for approximately three hours, at which time it was reacted with acetic acid after the manner of the first portion. The resulting two batches of silica gel, after being washed and dried substantially as described in Example 1, were separately subjected to repeated hydrations and dehydrations as described in Example 1. The hydration and dehydration characteristics of these gels are tabulated below.

| Absolute pressure, mm. Hg | Water content mols $H_2O/SiO_2$ | | | |
|---|---|---|---|---|
| | Portion 1 | | Portion 2 | |
| | Hydration | Dehydration | Hydration | Dehydration |
| 1.0 | 0.24 | 0.24 | 0.46 | 0.46 |
| 2.0 | 0.30 | 0.30 | 0.56 | 0.58 |
| 3.0 | 0.36 | 0.41 | 0.62 | 0.62 |
| 4.0 | 0.38 | 0.51 | 0.64 | 0.64 |
| 5.0 | 0.42 | 0.54 | 0.67 | 0.67 |
| 6.0 | 0.45 | 0.57 | 0.70 | 0.71 |
| 7.0 | 0.50 | 0.59 | 0.75 | 0.75 |
| 8.0 | 0.55 | 0.62 | 0.79 | 0.79 |
| 9.0 | 0.59 | 0.66 | 0.87 | 0.87 |
| 10.0 | 0.72 | 0.74 | 1.03 | 1.03 |
| 11.0 | 0.98 | 0.98 | 1.45 | 1.45 |

It is evident from the above tabulation that the second described portion had the controlled porosity and active surface area characteristics of gels having common hydration and dehydration curves whereas the tests on the first of these portions illustrates that the heat treatment was not of such extent as adequately to develop those characteristics.

Practice of the invention yields improved products characterized by controlled surface properties which are desirable in contact masses for a wide variety of uses in fluid contacting operations or both the organic and inorganic industrial fields. The process of the invention greatly reduces or even eliminates undesirable types of surfaces in highly absorptive contact masses derived from gels or gelatinous precipitants.

The term "hydrous oxide" as utilized herein and in the appended claims includes within its scope, simple hydrous oxides, (i. e., those which do not form definite hydrates or hydroxides), hydrous hydrated oxides, hydrous hydroxides, and any blend or combination of any or all such hydrous materials.

We claim as our invention:

1. In preparing hydrous oxides containing silica gel, the process which comprises subjecting an alkali metal silicate solution in the substantial absence of a precipitating or coagulating agent to heat treatment at superatmospheric temperature sufficiently high to promote rapid hydrolysis therein but below a temperature at which substantial silica is precipitated, continuing said heat treatment for a time sufficient that dried gel obtained as product of the process is substantially free of sorption-desorption hysteresis, mixing the thus modified solution with a coagulating or precipitating agent to produce hydrous silica, and drying the hydrous silica so produced.

2. In the preparation of hydrous oxides containing silica, the process which comprises subjecting an alkali metal silicate solution in the substantial absence of a precipitating or coagulating agent to heat treatment at a temperature of about 212° F. for a period of more than 15 minutes and sufficiently long to substantially free dried product of the process of sorption-desorption hysteresis, mixing the thus modified silicate solution with a coagulating or precipitating agent to produce hydrous silica and drying the hydrous silica to produce a porous adsorptive mass substantially free of sorption-desorption hysteresis.

3. The process of preparing hydrous oxides containing silica, the process which comprises subjecting an alkali metal silicate solution in the substantial absence of a precipitating or coagulating agent to heat treatment at a temperature within the range of 140° F. to 300° F. for a time, dependent upon the temperature to which the solution is heated, sufficient to increase substantially its content of hydrolyzed colloidal silica and to substantially free dried product of the process of sorption-desorption hysteresis, interacting the thus treated silicate solution with a coagulating or precipitating agent comprising a compound of a metal which yields metal oxide in addition to hydrous silica, and drying the gel thereby produced.

4. The process in accordance with claim 3 wherein the coagulating or precipitating agent is a compound of aluminum.

5. The method of preparing silica gel which comprises subjecting an alkali metal silicate solution to heat treatment at a temperature of 140° F. to 300° F. for a time sufficient, dependent upon the temperature to which the solution is heated, to eliminate substantially sorption-desorption hysteresis from the product of the process and under conditions avoiding coagulation or precipitation at the temperature of treatment, thereafter effecting gellation of the silicate solution and drying the gel.

HARRY B. WEISER.
WINFRED O. MILLIGAN.